US006252669B1

(12) United States Patent
Drabarek

(10) Patent No.: US 6,252,669 B1
(45) Date of Patent: *Jun. 26, 2001

(54) INTERFEROMETRIC INSTRUMENT PROVIDED WITH AN ARRANGEMENT FOR PRODUCING A FREQUENCY SHIFT BETWEEN TWO INTERFERING BEAM COMPONENTS

(75) Inventor: Pawel Drabarek, Tiefenbronn (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,313

(22) Filed: May 22, 1998

(30) Foreign Application Priority Data

May 26, 1997 (DE) ............................................. 197 21 881

(51) Int. Cl.[7] ........................................................ G01B 9/02
(52) U.S. Cl. ............................ 356/489; 356/511; 356/497
(58) Field of Search ................................... 356/345, 349, 356/351, 357, 359, 360, 489, 511, 512, 479, 497

(56) References Cited

U.S. PATENT DOCUMENTS 5,321,501 * 6/1994 Swanson et al. ..................... 356/345

FOREIGN PATENT DOCUMENTS

| 39 06 118 | 8/1990 | (DE) . |
| 41 08 944 | 9/1992 | (DE) . |
| 43 36 318 | 4/1995 | (DE) . |
| 195 22 262 | 1/1997 | (DE) . |
| 2 325 739 | 12/1998 | (GB) . |

OTHER PUBLICATIONS

Dresel et al., "Three Dimensional Sensing of Rough Surfaces By Coherence Radar", App. Opt., vol. 3, No. 7, Mar. 1, 1992.

* cited by examiner

Primary Examiner—Samuel A. Turner
(74) Attorney, Agent, or Firm—Kenyon & Kenyon

(57) ABSTRACT

An interferometric instrument for sensing the surfaces of a test object includes a radiation generating unit for emitting briefly coherent radiation and a first beam splitter for producing a first and second beam component. One beam component is aimed at the surface to be sensed and the other beam component is aimed at a device with a reflective element for periodically changing the light path. The instrument also has an interference element which causes the radiation coming from the surface and the radiation coming from the reflecting device to interfere with one another and a photodetector which receives the radiation. A simple design is used to achieve a highly accurate measurement by providing an arrangement which produces a frequency shift between the two interfering beam components in the optical path of the first beam component and/or in the optical path of the second beam component.

8 Claims, 2 Drawing Sheets

INTERFEROMETRIC INSTRUMENT PROVIDED WITH AN ARRANGEMENT FOR PRODUCING A FREQUENCY SHIFT BETWEEN TWO INTERFERING BEAM COMPONENTS

FIELD OF THE INVENTION

The present invention relates to an interferometric instrument for scanning the rough surfaces of a test object. The interferometric instrument of the present invention includes a radiation generating unit, which emits briefly coherent radiation, and a first beam splitter for generating a first and second beam component. According to the present invention, one beam component is aimed at the surface to be sensed, and the other beam component is aimed at a device with a reflective element for periodically changing the light path. The interferometric instrument of the present invention further includes an interference element, which causes the radiation coming from the surface and the radiation coming from the reflecting device to interfere with one another, and a photodetector which absorbs the radiation.

BACKGROUND INFORMATION

A known interferometric instrument is described in the publication by T. Dresel, G. Häusler, H. Vanzke entitled "Three-Dimensional Sensing of Rough Surfaces by Coherence Radar", App. Opt., Vol. 3, No. 7, dated Mar. 1, 1992. This publication proposes an interferometer with a briefly coherent light source and a piezoelectric mirror for sensing rough surfaces. In the measuring instrument, a first beam component in the form of a light wave radiated back from a test object has a second beam component in the form of a reference wave superimposed upon it. The two light waves have a very short coherence length (just a few $\mu$m) so that the interference contrast reaches its maximum when the optical path difference is zero. A reflecting element in the form of a piezoelectric mirror is provided for changing the light path of the reference wave. The distance to the test object can be determined by comparing the position of the piezoelectric mirror with the time at which the interference maximum occurs. However, the precise measurement of the interference maximum and its assignment to the light path is relatively complicated.

SUMMARY OF THE INVENTION

An object of the present invention is to provide an interferometric instrument with a simplified design and increased measuring accuracy. The present invention therefore calls for an arrangement which produces a frequency shift between the two interfering beam components to be provided in the optical path of the first beam component and/or in the optical path of the second beam component.

The arrangement producing a frequency shift between the two interfering beam components can be used to carry out analyses using heterodyne interferometric techniques. This makes it possible to determine the time at which the interference maximum occurs. With its simple design, the instrument can therefore precisely measure the distance to a difficult-to-access test object relatively easily. Details regarding the heterodyne interferometric method itself can be found in the literature.

A simple measuring instrument design is obtained, for example, by designing the arrangement as an acousto-optical modulator driven by a modulator driver which is positioned between the first beam splitter and the test object in the optical path of the first beam component.

The device for changing the light path has an acousto-optical deflector arrangement with at least two acousto-optical deflectors, followed by the stationary reflecting element, which is positioned in the optical path of the second beam component in order to change its light path. The deflectors are frequency-modulated and arranged in relation to the incoming second beam component and to the reflecting element so that the second beam component supplied to the interference element determines the change in its light path when it is deflected in the deflectors. Because of this arrangement, a simplified and more accurate analysis is achieved, since the use of a mechanically moving reflecting element is avoided. The light path can be very precisely determined and assigned to the interference maximum.

Since the two deflectors are driven by two deflector drivers with slightly different carrier frequencies, causing the second beam component to undergo a frequency shift, it is no longer necessary to use an additional acousto-optical modulator to generate the heterodyne frequency. Instead, the existing acousto-optical deflectors, which produce a change in the light path, are used to generate the heterodyne frequency. If the modulation frequency of the carrier frequencies is around 10 MHZ, for example, the slight frequency difference between the carrier frequencies can amount to 0.5 MHZ. The deflector drivers can consist of two driver stages of a deflector driver unit.

To achieve a simple design, the modulation frequency of the carrier frequencies can be generated by a common control unit, to which the two deflector drivers can also be connected. With a simple design for accurate analysis, for example, the first deflector deflects the incoming beam component around an angle variable over time as a function of the frequency. The second deflector resets the angular deflection so that the second beam component continues to move in the direction of incidence parallel to the first deflector, and the reflecting element is designed as a diffraction grating oriented at an angle to the beam component leaving the second deflector so that the beam component is radiated back in the direction of incidence.

According to the present invention, signal processing and analysis can be achieved by combining the control unit and a driving unit to form an analysis circuit. Information about the modulation frequency of the carrier frequencies is sent to the analysis unit, which also receives the output signal of the photodetector, and the analysis circuit can be used to measure the distance to the measuring point on the measuring object on the basis of the frequency information and the output signal.

In a suitable embodiment, a collimator is positioned between the radiation generating unit and the first beam splitter, while a second beam splitter is located between the beam splitter and the test object in order to direct the first beam component to the test object via a focusing lens and to direct the first beam component reflected from the test object to the interference element in the form of an additional beam splitter. In addition, a third beam splitter is positioned between the first beam splitter and the first deflector and used to direct the second beam component returning from the first deflector to the additional beam splitter so that it will interfere with the first beam component reflected from the test object.

DETAILED DESCRIPTION

Figure 1:
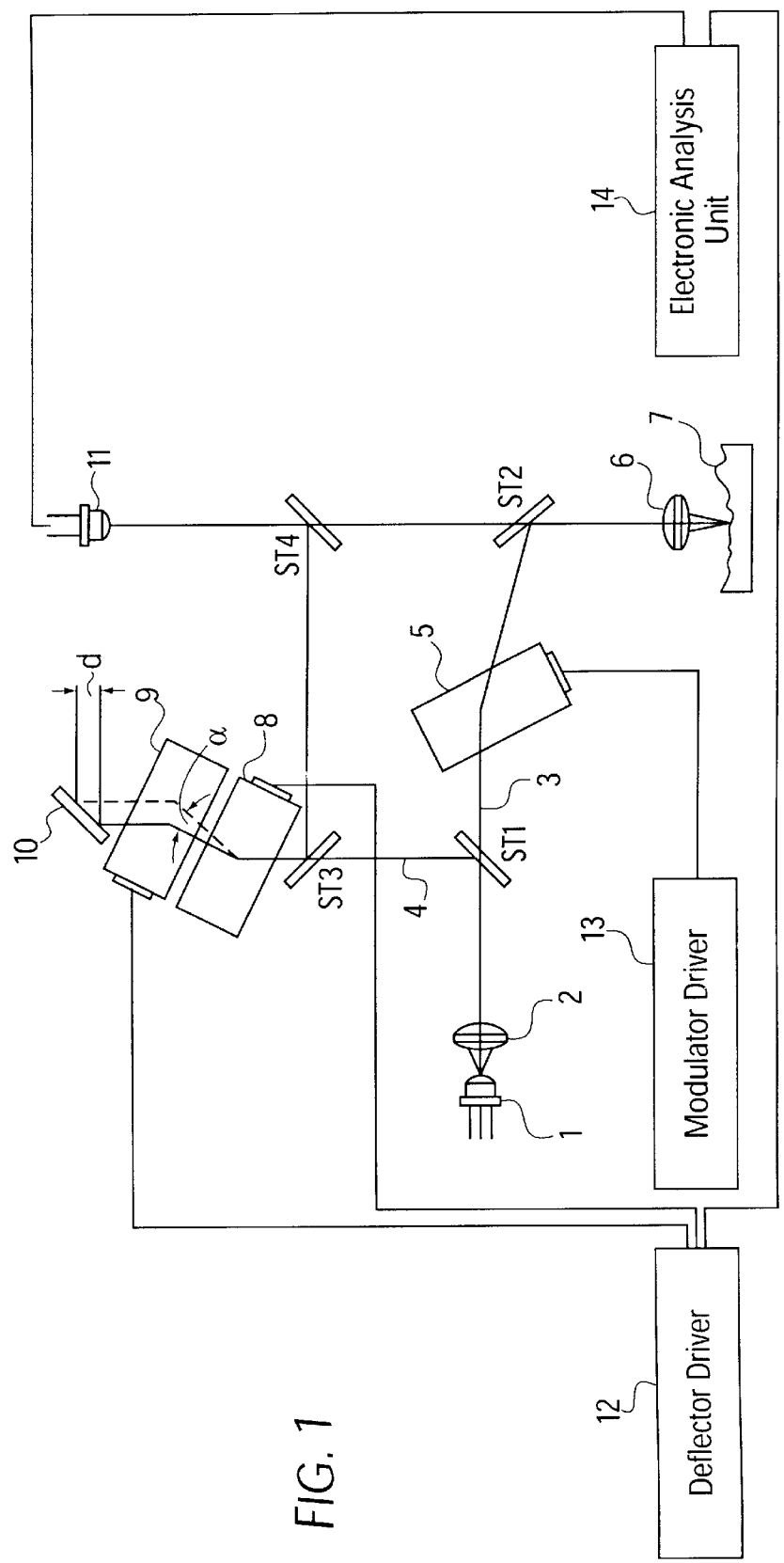
FIG. 1 shows an interferometric instrument for sensing the rough surfaces of a test object according to a first embodiment of the present invention.

FIG. 1 shows an interferometric instrument that includes a radiation generating unit in the form of a light source 1, such as, for example, an injection laser diode. Light source 1 produces a collimated beam of a briefly coherent radiation through collimator 2. This beam is split into a first and a second beam component 3 and 4 by a first beam splitter ST1. First beam component 3 is directed to the surface of a test object 7 via a second beam splitter ST2 and a focusing lens 6, using an acousto-optical modulator 5. After being reflected back, first beam component 3 reaches a fourth beam splitter ST4.

Second beam component 4, which was split in first beam splitter ST1, passes through a third beam splitter ST3 and finally through two acousto-optical deflectors 8, 9, which are frequency-modulated by a common deflector driver 12. The frequency modulation causes the deflection angle of second beam component 4 to vary by an angle α in first acousto-optical deflector 8. In second acousto-optical deflector 9, second beam component 4 is subsequently deflected again in a direction in which it strikes first acousto-optical deflector 8. This produces a parallel shift in second beam component 4 as it leaves second acousto-optical deflector 9, with this second beam component 4 illuminating a reflecting element in the form of a diffraction grating 10. Diffraction grating 10 is inclined at a specific angle so that, regardless of the parallel shift, diffracted second beam component 4 is radiated back to the interferometric arrangement, passing through third beam splitter ST3 and superimposing itself on first beam component 3 coming from test object 7 in fourth beam splitter ST4. The interference contrast reaches its maximum when both beam components 3 and 4 have covered the same optical distance.

Since both acousto-optical deflectors 8, 9 are arranged so that the angular deflection of first deflector 8 is reset in second deflector 9, and second beam component 4 only undergoes a parallel shift, the light path or optical path (run time) of second beam component 4 is modulated. When the optical path difference between both beam components 3, 4 is zero, a photodetector 11 positioned in the optical path downstream from fourth beam splitter ST4 also detects the interference maximum. The distance to test object 7 can be precisely determined by using analysis circuit 14. This distance determination is accomplished by comparing the time at which the interference maximum or the signal maximum of photodetector 11 is reached with the instantaneous frequency of deflector driver 12. When an acousto-optical modulator 6 is positioned between first beam splitter ST1 and second beam splitter ST2 in order to shift the frequency of the first beam component 3, photodetector 11 detects the interference maximum in the form of an alternating signal with the frequency at which acousto-optical modulator 5 is driven by a modulator driver 13. This achieves a heterodyne interferometric analysis which makes it possible to more precisely determine the time at which the interference maximum occurs.

Figure 2:
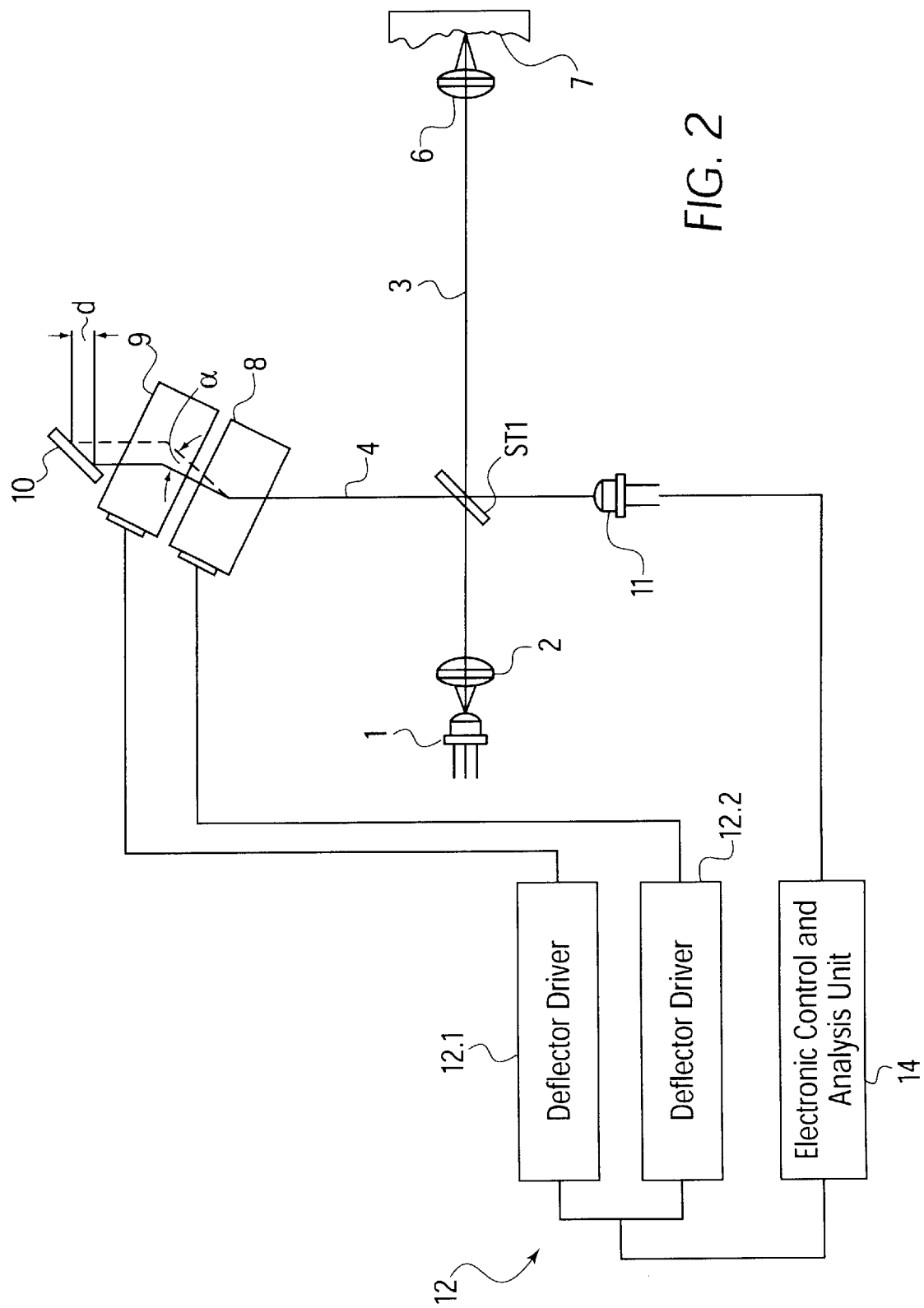
FIG. 2 shows an interferometric instrument according to another embodiment of the present invention.

FIG. 2 shows an interferometric instrument according to another embodiment of the present invention, in which the surfaces of a test object 7 is sensed by means of briefly coherent radiation in conjunction with a heterodyne interferometric analysis. In this case, a collimated beam of a briefly coherent light source 1 is once again split into two beam components 3, 4 in a first beam splitter ST1. First beam component 3 is directed to test object 7 via a focusing lens 6. Second beam component 4 passes through two acousto-optical deflectors 8, 9 and illuminates diffraction grating 10. In this case as well, diffraction grating 10 is inclined at a specific angle so that, regardless of the parallel shift, diffracted second beam component 4 is radiated back to the interferometric arrangement and superimposes itself on first beam component 3 reflected from test object 7 in first beam splitter ST1. Superimposed beam components 3, 4 illuminate photodetector 11. Both acousto-optical deflectors 8, 9 are driven by two deflector drivers 1, 2 with slightly different carrier frequencies, with the frequency difference amounting to 0.5 MHZ, for example in the case of a carrier frequency of around 10 MHZ. As a result, second beam component 4 undergoes a frequency shift that is equal to twice the difference in carrier frequencies. In the example discussed above, the frequency shift would be equal to 1 MHZ. The carrier frequencies are modulated by a control unit, which can be combined with an analysis unit to form an analysis circuit 14, thereby modulating the light path (run time) of second beam component 4, as was the case in the embodiment of FIG. 1. The distance to test object 7 can be measured by comparing the time at which the heterodyne interference signal maximum is reached, for example, by using the instantaneous frequency of the control unit.

What is claimed is:

1. An interferometric instrument for sensing a surface of a test object, comprising:

a radiation producing unit for emitting a briefly coherent radiation;

an arrangement for periodically changing a light path of a received beam component, the arrangement including at least two acousto-optical deflectors and a stationary reflecting element that receives the received beam component directly from the at least two acousto-optical deflectors, the stationary reflecting element being a grating;

a first beam splitter for generating a first beam component and a second beam component in response to the briefly coherent radiation, the first beam component being aimed at the surface of the test object and the second beam component being aimed at the reflecting element;

an interference element for causing the first beam component reflected from the surface of the test object and the second beam component reflected from the reflecting element to interfere with one another to produce an interfered radiation;

a photodetector for receiving the interfered radiation; and a frequency shift arrangement for producing a frequency shift between the first beam component and the second beam component of the interfered radiation, the frequency shift arrangement being provided in at least one of an optical path of the first beam component and an optical path of the second beam component.

2. The interferometric instrument according to claim 1, further comprising a modulator driver positioned between the first beam splitter and the test object in the optical path of the first beam component, wherein the frequency shift arrangement is an acousto-optical modulator driven by the modulator driver.

3. The interferometric instrument according to claim 1, wherein the reflecting element is an acousto-optical deflector arrangement positioned in the optical path of the second beam component in order to change the optical path of the second beam component, the acousto-optical deflector arrangement including:

a first acousto-optical deflector, a second acousto-optical deflector, and a stationary reflecting element, wherein each one of the first acousto-optical deflector and the second acousto-optical deflector is frequency modulated and positioned in relation to the second beam component to determine a predetermined amount by which the second beam component supplied to the interference element is deflected in the first acousto-optical deflector and in the second acousto-optical deflector.

4. The interferometric instrument according to claim 3, further comprising:

a first deflector driver for driving the first acousto-optical deflector and operating in accordance with a first carrier frequency; and a second deflector driver for driving the second acousto-optical deflector and operating in accordance with a second carrier frequency that is different than the first carrier frequency in order to produce a frequency shift in the second beam component.

5. The interferometric instrument according to claim 4, further comprising a common control unit for modulating the first carrier frequency and the second carrier frequency.

6. An interferometric instrument for sensing a surface of a test object, comprising:

a radiation producing unit for emitting a briefly coherent radiation;

an arrangement for periodically changing a light path of a received beam component, the arrangement including an acousto-optical deflector arrangement and a reflecting element;

a first beam splitter for generating a first beam component and a second beam component in response to the briefly coherent radiation, the first beam component being aimed at the surface of the test object and the second beam component being aimed at the reflecting element;

an interference element for causing the first beam component reflected from the surface of the test object and the second beam component reflected from the reflecting element to interfere with one another to produce an interfered radiation;

a photodetector for receiving the interfered radiation;

a frequency shift arrangement for producing a frequency shift between the first beam component and the second beam component of the interfered radiation, the frequency shift arrangement being provided in at least one of an optical path of the first beam component and an optical path of the second beam component, wherein the arrangement for periodically changing the light path is positioned in the optical path of the second beam component in order to change the optical path of the second beam component, the acousto-optical deflector arrangement including:

a first acousto-optical deflector, and a second acousto-optical deflector, wherein the reflecting element is a stationary reflecting element, and wherein each one of the first acousto-optical deflector and the second acousto-optical deflector is frequency modulated and positioned in relation to the second beam component to determine a predetermined amount by which the second beam component supplied to the interference element is deflected in the first acousto-optical deflector and in the second acousto-optical deflector;

a first deflector driver for driving the first acousto-optical deflector and operating in accordance with a first carrier frequency;

a second deflector driver for driving the second acousto-optical deflector and operating in accordance with a second carrier frequency that is different than the first carrier frequency in order to produce a frequency shift in the second beam component; and a common control unit for modulating the first carrier frequency and the second carrier frequency, wherein the first acousto-optical deflector deflects the second beam component around an angle by an angular deflection that is variable over time as a function of a predetermined frequency, wherein the second acousto-optical deflector resets the angular deflection so that the second beam component moves parallel to the first acousto-optical deflector in a direction of incidence, and wherein the reflecting element includes a diffraction grating which is oriented at an angle to the second beam component at which the second beam component is radiated back in the direction of incidence.

7. The interferometric instrument according to claim 6, further comprising a driver unit, wherein the common control unit and the driver unit form an analysis circuit, the analysis circuit having an input for receiving information about a modulation frequency of the first carrier frequency and the second carrier frequency and an input for receiving an output signal of the photodetector, wherein the analysis circuit measures a distance to a test point on the test object on the basis of the information about the modulation frequency and the output signal of the photodetector.

8. The interferometric instrument according to claim 3, further comprising:

a collimator positioned between the radiation producing unit and the first beam splitter;

a focusing lens;

a second beam splitter for directing the first beam component to the test object via the focusing lens and for directing the first beam component reflected from the test object to the interference element, the second beam splitter being located between the first beam splitter and the test object, wherein the interference element is a first additional beam splitter; and a third beam splitter positioned between the first beam splitter and the first acousto-optical deflector, the third beam splitter directing the second beam component to the first additional beam splitter as the second beam component returns from the first acousto-optical deflector in order to cause the second beam component to interfere with the first beam component reflected from the test object.

\* \* \* \* \*